United States Patent
Nakaseko et al.

(10) Patent No.: US 12,504,488 B2
(45) Date of Patent: Dec. 23, 2025

(54) SOUND-PROOFING TUBE FOR MAGNETIC RESONANCE IMAGING APPARATUS, MAGNETIC RESONANCE IMAGING APPARATUS, AND MANUFACTURING METHOD OF SOUND-PROOFING TUBE FOR MAGNETIC RESONANCE IMAGING APPARATUS

(71) Applicant: CANON MEDICAL SYSTEMS CORPORATION, Otawara (JP)

(72) Inventors: Takumi Nakaseko, Otawara (JP); Akihiko Taniguchi, Otawara (JP); Tatsuo Osaka, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 212 days.

(21) Appl. No.: 18/327,930

(22) Filed: Jun. 2, 2023

(65) Prior Publication Data
US 2023/0408609 A1    Dec. 21, 2023

(30) Foreign Application Priority Data

Jun. 10, 2022 (JP) .............................. 2022-094450
May 26, 2023 (JP) .............................. 2023-086750

(51) Int. Cl.
G01V 3/00      (2006.01)
G01R 33/385    (2006.01)
B29C 70/32     (2006.01)
B29L 23/00     (2006.01)

(52) U.S. Cl.
CPC .......... *G01R 33/3854* (2013.01); *B29C 70/32* (2013.01); *B29L 2023/22* (2013.01)

(58) Field of Classification Search
CPC .. G01R 33/3854; B29C 70/32; B29L 2023/22
USPC ......................................................... 324/307
See application file for complete search history.

(56) References Cited

U.S. PATENT DOCUMENTS

2014/0008143 A1* 1/2014 Eberler .............. G01R 33/3802
                                                    181/202

FOREIGN PATENT DOCUMENTS

| CN | 105682633 | A | * | 6/2016 | ........... A61F 7/0053 |
| CN | 108407830 | A | * | 8/2018 | ............ B61D 17/00 |
| CN | 111207250 | A | * | 5/2020 | |
| JP | 2009-022640 | A | | 2/2009 | |

OTHER PUBLICATIONS

KR 20140133217 A (Lee) (Year: 2014).*
JP H0333547 U (No Name) (Year: 1991).*

* cited by examiner

Primary Examiner — Walter L Lindsay, Jr.
Assistant Examiner — Frederick Wenderoth
(74) Attorney, Agent, or Firm — Oblon, McClelland, Maier & Neustadt, L.L.P.

(57) ABSTRACT

A magnetic resonance imaging apparatus sound-proofing tube according to an embodiment is a sound-proofing tube for a magnetic resonance imaging apparatus and is formed by using a composite material including a fiber material and a resin material. In the magnetic resonance imaging apparatus sound-proofing tube, the fiber material forms a woven structure by being woven therein. The woven structure is formed so as to continuously extend over at least one round of the lateral face of the sound-proofing tube.

8 Claims, 11 Drawing Sheets

| MATERIAL NAMES | DENSITY (g/cm³) | COMPOSITION RATIOS (%) |
|---|---|---|
| GLASS FIBER | 2.6 | 50 |
| EPOXY RESIN | 1.4 | 50 |

CE

| MATERIAL NAMES | DENSITY (g/cm³) | COMPOSITION RATIOS (%) |
|---|---|---|
| GLASS FIBER | 2.6 | 80 |
| EPOXY RESIN | 1.4 | 20 |

|  | CROSS ANGLE: 20° | CROSS ANGLE: 45° | CROSS ANGLE: 70° |
|---|---|---|---|
| YOUNG'S MODULUS (GPa) | 7.8 | 10.2 | 23.7 |
| ATTENUATION RATIO $\zeta$ | 0.061 | 0.074 | 0.080 |

FIG.13

|  | CROSS ANGLE: 45° | CROSS ANGLES: 20°&70° |
|---|---|---|
| YOUNG'S MODULUS (GPa) | 10.2 | 18.4 |

SOUND-PROOFING TUBE FOR MAGNETIC RESONANCE IMAGING APPARATUS, MAGNETIC RESONANCE IMAGING APPARATUS, AND MANUFACTURING METHOD OF SOUND-PROOFING TUBE FOR MAGNETIC RESONANCE IMAGING APPARATUS

CROSS-REFERENCE TO RELATED APPLICATIONS

This application is based upon and claims the benefit of priority from Japanese Patent Application No. 2022-094450, filed on Jun. 10, 2022; and Japanese Patent Application No. 2023-086750, filed on May 26, 2023, the entire contents of both of which are incorporated herein by reference.

FIELD

Embodiments described herein relate generally to a sound-proofing tube for a magnetic resonance imaging apparatus, a magnetic resonance imaging apparatus, and a manufacturing method of a sound-proofing tube for a magnetic resonance imaging apparatus.

BACKGROUND

Conventionally, Magnetic Resonance Imaging (MRI) apparatuses have, on the inner circumferential side of a gradient coil, a tube-shaped sound-proofing member (or "sound-proofing tube"; hereinafter, "bore tube") installed. The sound-proofing tube called a bore tube is a structure shaped by using a fiber-reinforced resin material and is configured to inhibit vibration and noise occurring from the gradient coil while having a necessary strength required of the MRI apparatus. These functions are realized, for example, by successively laminating fiber multiple times while implementing a filament winding method (hereinafter, "FW method") or shaping, into a tubular shape, a sheet of fiber-reinforced resin material which already has a woven structure.

According to the FW method, due to characteristics thereof, because it is possible to arrange the fiber as a continuous body, it is possible to produce a circular tube having high rigidity. However, because there is a limit to how much the density (area density) of the structure can be increased per unit area, the sound blocking capability thereof may be insufficient. In other words, because improving the sound blocking capability requires laminating multiple layers, a problem arises where the bore tube would become heavier. Further, although it is possible to improve the sound blocking capability of the woven sheet by increasing the area density thereof, because the produced circular tube has a seam, rigidity thereof may be insufficient. For these reasons, it is difficult, according to the conventional techniques, to produce a sound-proofing tube capable of realizing the sound blocking capability while being lightweight and having high rigidity.

BRIEF DESCRIPTION OF THE DRAWINGS

FIG. 12 is a table according to the embodiment example of the embodiment indicating examples of analysis results of tests performed on a test piece having a 20° cross angle, a test piece having a 45° cross angle, and a test piece having a 70° cross angle; and FIG. 13 is a table according to the embodiment example of the embodiment indicating examples of results of analyzing Young's modulus (GPa) values from tests performed on the test piece having the 45° cross angle and another test piece woven with cross angles of 20° and 70°.

DETAILED DESCRIPTION

A magnetic resonance imaging apparatus sound-proofing tube according to an embodiment is a sound-proofing tube for a magnetic resonance imaging apparatus and is formed by using a composite material including a fiber material and a resin material. In the magnetic resonance imaging apparatus sound-proofing tube, the fiber material forms a woven structure by being woven therein. The woven structure is formed so as to continuously extend over at least one round of the lateral face of the sound-proofing tube.

A sound-proofing tube for a Magnetic Resonance Imaging (hereinafter, "MRI") apparatus, an MRI apparatus, and a manufacturing method of a sound-proofing tube for an MRI apparatus will be explained below, with reference to the accompanying drawings. Technical concept of the present embodiment may also be applied to any of various types of modalities in which an MRI apparatus is incorporated, such as a Positron Emission Tomography (PET)-MRI apparatus or a Single Photon Emission Computed Tomography (SPECT)-MRI apparatus.

EMBODIMENTS

Figure 1:
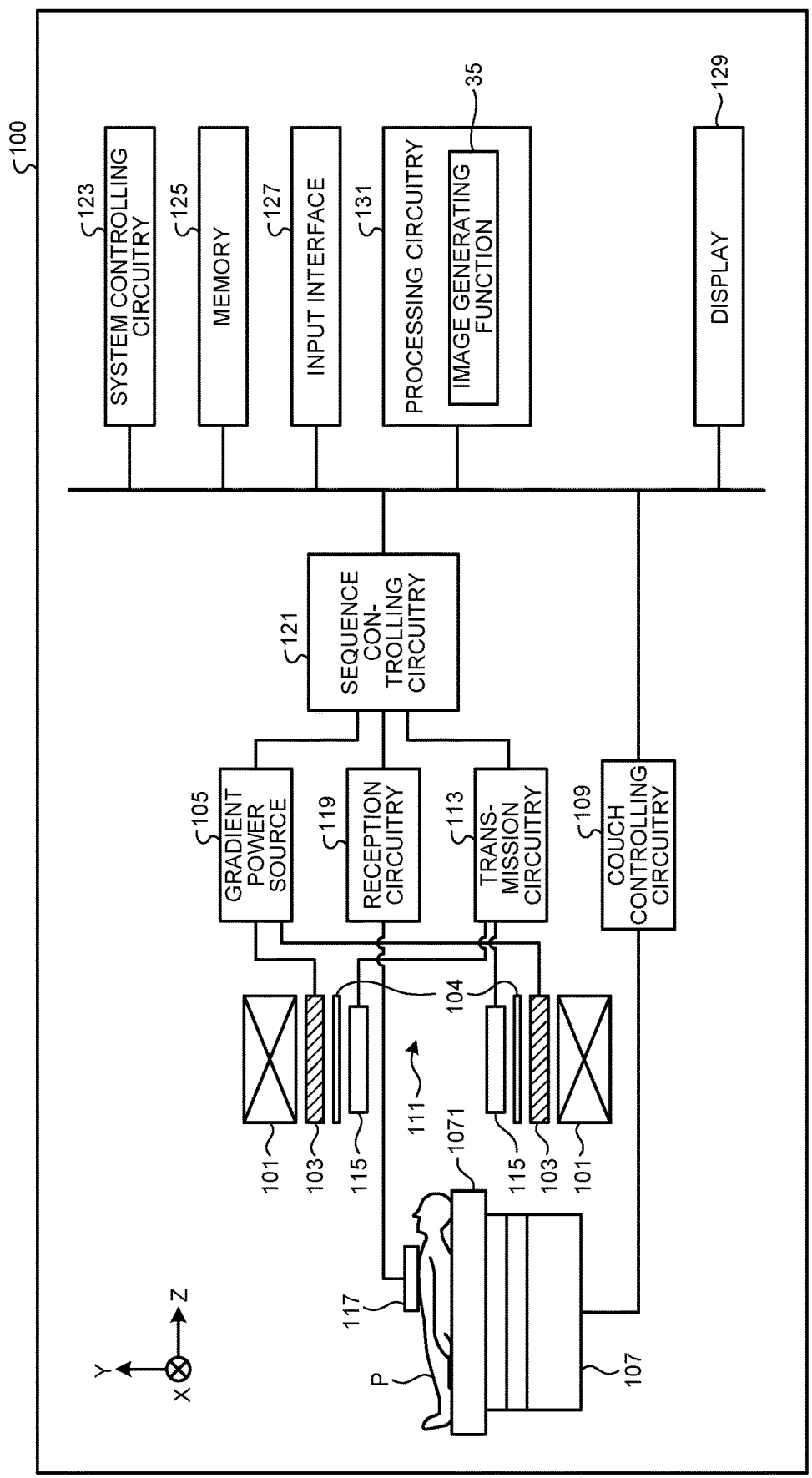
FIG. 1 is a diagram illustrating an example of an MRI apparatus according to an embodiment of the present disclosure.

FIG. 1 is a diagram illustrating an example of an MRI apparatus 100 according to an embodiment of the present disclosure. As illustrated in FIG. 1, the MRI apparatus 100 includes a static magnetic field magnet 101, a gradient coil 103, a bore tube 104, a gradient power source 105, a couch 107, couch controlling circuitry 109, transmission circuitry 113, a transmission coil 115, a reception coil 117, reception circuitry 119, sequence controlling circuitry (which may be referred to as "imaging controlling circuitry" or an "imaging controlling unit") 121, system controlling circuitry (a system controlling unit) 123, a memory 125, an input interface 127, a display 129, and processing circuitry 131.

The static magnetic field magnet 101 is a magnet formed to have a hollow and substantially circular cylindrical shape. The static magnetic field magnet 101 is configured to generate a substantially uniform static magnetic field in the space inside thereof. For example, a superconductive magnet or the like may be used as the static magnetic field magnet 101.

The gradient coil 103 is a coil formed to have a hollow and substantially circular cylindrical shape and is arranged on the inner surface side of a circular cylindrical cooling container. In other words, the gradient coil 103 is provided on the inner circumferential side of the static magnetic field magnet 101. As the gradient coil 103, for example, an Actively Shielded Gradient Coil (ASGC) may be used.

By individually receiving electric current supplies from the gradient power source 105, the gradient coil 103 is configured to generate gradient magnetic fields of which magnetic field intensities change along X-, Y-, and Z-axes that are orthogonal to one another. The gradient magnetic fields generated along the X-, Y-, and Z-axes by the gradient coil 103 form, for example, a slice selecting gradient magnetic field, a phase encoding gradient magnetic field, and a frequency encoding gradient magnetic field. The slice selecting gradient magnetic field is used for arbitrarily determining an imaged cross-sectional plane. The phase encoding gradient magnetic field is used for changing the phase of a magnetic resonance signal (hereinafter, "MR signal") in accordance with spatial positions. The frequency encoding gradient magnetic field is used for changing the frequency of an MR signal in accordance with spatial positions.

The bore tube 104 forms a space (a bore 111) in which an examined subject (hereinafter, "patient") P is placed. The bore tube 104 is arranged in the space inside the gradient coil 103. The bore tube 104 corresponds to a sound-proofing tube that is for the magnetic resonance imaging apparatus 100 and is formed on the inner circumferential side of the gradient coil 103 by using a composite material including a fiber material and a resin material. In the bore tube 104, the transmission coil 115 and a couch rail are installed. The couch rail is a rail used for inserting a couchtop 1071 on which the patient P is placed, into the bore 111. Details of the bore tube 104 will be explained later.

The gradient power source 105 is a power source apparatus configured to supply the electric currents to the gradient coil 103 under control of the sequence controlling circuitry 121.

The couch 107 is an apparatus provided with the couchtop 1071 on which the patient P is placed. The couch 107 is configured to insert the couchtop 1071 on which the patient P is placed, into the bore 111, under control of the couch controlling circuitry 109.

The couch controlling circuitry 109 is circuitry configured to control the couch 107. The couch controlling circuitry 109 is configured to move the couchtop 1071 in longitudinal directions and up-and-down directions by driving the couch 107 according to instructions received from an operator via an input/output interface 17.

The transmission circuitry 113 is configured to supply a radio frequency pulse modulated with a Larmor frequency to the transmission coil 115, under control of the sequence controlling circuitry 121. For example, the transmission circuitry 113 includes an oscillating unit, a phase selecting unit, a frequency converting unit, an amplitude modulating unit, a Radio Frequency (RF) amplifier, and the like. The oscillating unit is configured to generate an RF pulse at a resonance frequency unique to targeted atomic nuclei placed in the static magnetic field. The phase selecting unit is configured to select a phase of the RF pulse generated by the oscillating unit. The frequency converting unit is configured to convert the frequency of the RF pulse output from the phase selecting unit. The amplitude modulating unit is configured to modulate the amplitude of the RF pulse output from the frequency converting unit, according to a sinc function, for example. The RF amplifier is configured to amplify the RF pulse output from the amplitude modulating unit and to supply the amplified RF pulse to the transmission coil 115.

The transmission coil 115 is an RF coil arranged on the inside of the gradient coil 103. The transmission coil 115 is configured to generate an RF pulse corresponding to a radio frequency magnetic field in accordance with the output of the transmission circuitry 113. The transmission coil 115 may be referred to as a Whole Body (WB) coil. The transmission coil 115 is supported by the bore tube 104, for example.

The reception coil 117 is an RF coil arranged on the inside of the gradient coil 103. The reception coil 117 is configured to receive an MR signal emitted from the patient P, due to the radio frequency magnetic field. The reception coil 117 is configured to output the received MR signal to the reception circuitry 119. For example, the reception coil 117 is a coil array including one or more (typically two or more) coil elements (which hereinafter will be referred to as "the plurality of coils").

Further, although FIG. 1 illustrates the example in which the transmission coil 115 and the reception coil 117 are separate RF coils, the transmission coil 115 and the reception coil 117 may be realized as an integrally-formed transmission/reception coil. The transmission/reception coil corresponds to an imaged site of the patient P and is a local transmission/reception RF coil such as a head coil, for example.

Under control of the sequence controlling circuitry 121, the reception circuitry 119 is configured to generate a digital MR signal (hereinafter, "MR data"), on the basis of the MR signal output from the reception coil 117. More specifically, the reception circuitry 119 is configured to generate the MR data, by performing signal processing such as wave detection and filtering on the MR signal output from the reception coil 117 and subsequently performing an Analog-to-Digital conversion (hereinafter, "A/D conversion") on the data resulting from the signal processing. The reception circuitry 119 is configured to output the generated MR data to the sequence controlling circuitry 121. For example, the MR data is generated with respect to each of the plurality of coils and is output to the sequence controlling circuitry 121 together with a tag identifying a corresponding one of the plurality of coils.

The sequence controlling circuitry 121 is configured to perform an imaging process on the patient P, by controlling the gradient power source 105, the transmission circuitry 113, the reception circuitry 119, and the like, according to an image taking protocol output from processing circuitry 131. The image taking protocol includes a pulse sequence corresponding to the type of a medical examination. The image taking protocol defines: a magnitude of the electric current to be supplied by the gradient power source 105 to the gradient coil 103; timing with which the electric current is to be supplied by the gradient power source 105 to the gradient coil 103; a magnitude and a time width of the radio frequency pulse to be supplied by the transmission circuitry 113 to the transmission coil 115; timing with which the radio frequency pulse is to be supplied by the transmission circuitry 113 to the transmission coil 115; timing with which the MR signal is to be received by the reception coil 117; and the like. When having received the MR data from the reception circuitry 119, as a result of imaging the patient P by driving the gradient power source 105, the transmission circuitry 113, the reception circuitry 119, and the like, the sequence controlling circuitry 121 is configured to transfer the received MR data to the processing circuitry 131, or the like.

The sequence controlling circuitry 121 includes, as hardware resources thereof, a processor as well as one or more memory elements such as a Read-Only Memory (ROM), a Random Access memory (RAM), and/or the like. The term "processor" denotes, for example, a Central Processing Unit (CPU), a Micro Processing Unit (MPU), a Graphics Processing Unit (GPU), or circuitry such as an Application Specific Integrated Circuit (ASIC) or a programmable logic device (e.g., a Simple Programmable Logic Device (SPLD), a Complex Programmable Logic Device (CPLD), or a Field Programmable Gate Array (FPGA)). The sequence controlling circuitry 121 corresponds to a sequence controlling unit.

The system controlling circuitry 123 includes, as hardware resources thereof, a processor as well as one or more memory elements such as a ROM, a RAM, and/or the like and is configured to control the MRI apparatus 100 by employing a system controlling function. More specifically, the system controlling circuitry 123 is configured to read a system controlling program stored in a memory, to load the read program into a memory, and to control pieces of circuitry of the MRI apparatus 100 according to the loaded system controlling program. In other words, the system controlling circuitry 123 is configured to exercise overall control of the MRI apparatus 100.

For example, the system controlling circuitry 123 is configured to read the image taking protocol from the memory 125 on the basis of an image taking condition input by the operator via the input interface 127. The system controlling circuitry 123 is configured to transmit the image taking protocol to the sequence controlling circuitry 121 so as to control the imaging process performed on the patient P. For example, the system controlling circuitry 123 is realized by using a processor. Alternatively, the system controlling circuitry 123 may be incorporated in the processing circuitry 131. In that situation, the system controlling function is executed by the processing circuitry 131, so that the processing circuitry 131 functions as a substitute for the system controlling circuitry 123. Because details of the processor realizing the system controlling circuitry 123 are the same as above, explanations thereof will be omitted.

The memory 125 configured to store therein various types of programs related to the system controlling function executed by the system controlling circuitry 123, various types of image taking protocols, image taking conditions including a plurality of image taking parameters defining image taking protocols, and the like. Further, the memory 125 is configured to store therein an image generating function 35 realized by the processing circuitry 131 in the form of a computer-executable program.

Furthermore, the memory 125 is configured to store therein various types of data obtained by the sequence controlling circuitry 121, various types of data used in processes performed by the image generating function 35, MR images generated by the image generating function 35, and the like. Also, the memory 125 is configured to store therein the MR data obtained by scanning the patient P and an algorithm used for reconstructing an MR image on the basis of the MR data.

In addition, the memory 125 may store therein various types of data received via a communication interface (not illustrated). For example, the memory 125 may store therein information (e.g., an imaged site, the purpose of a medical examination) related to an examination order for the patient P received from an information processing system inside a medical facility such as a Radiology Information System (RIS).

For example, the memory 125 is realized by using a semiconductor memory element such as a ROM, a RAM, or a flash memory, or a Hard Disk Drive (HDD), a Solid State Drive (SSD), an optical disc, or the like. Further, the memory 125 may be realized by using a Compact Disc Read-Only Memory (CD-ROM) drive, a Digital Versatile Disc (DVD) drive, or a drive apparatus configured to read and write various types of information from and to a portable storage medium such as a flash memory.

The input interface 127 is configured to receive various types of instructions and inputs of information from the operator. For example, the input interface 127 is realized by using a trackball, a switch button, a mouse, a keyboard, a touchpad on which input operations can be performed by touching an operation surface thereof, a touch screen in which a display screen and a touchpad are integrally formed, contactless input circuitry using an optical sensor, audio input circuitry, and/or the like. The input interface 127 is connected to the processing circuitry 131 and is configured to convert an input operation received from the operator into an electrical signal and to output the electrical signal to the processing circuitry 131.

In the present disclosure, the input interface 127 does not necessarily have to include physical operation component parts such as a mouse, a keyboard, and/or the like. For instance, possible examples of the input interface 127 include electrical signal processing circuitry configured to receive an electrical signal corresponding to an input operation from an external input machine provided separately from the MRI apparatus 100 and to output the electrical signal to controlling circuitry.

The input interface 127 is configured to receive an input of a Field of View (FOV) according to a user instruction, with respect to a pre-scan image displayed on the display 129. More specifically, the input interface 127 is configured to receive the input of the FOV according to a range setting instruction from the user, within a locator image displayed on the display 129. Further, according to user instructions based on the examination order, the input interface 127 is configured to receive inputs of various types of image taking parameters related to the scan and a pulse sequence selecting instruction.

The display 129 is configured to display various types of Graphical User Interfaces (GUIs), the MR image generated by the processing circuitry 131, and the like, under control of the processing circuitry 131 or the system controlling circuitry 123. Further, the display 129 is configured to display the image taking parameters related to the scan, various types of information related to image processing, and the like. For example, the display 129 is realized by using a display mechanism such as a Cathode Ray Tube (CRT) display, a liquid crystal display, an organic electroluminescence (EL) display, a Light Emitting Diode (LED) display, a plasma display, or other arbitrary displays and monitors known in the relevant technical field.

For example, the processing circuitry 131 is realized by using a processor such as that described above. The processing circuitry 131 includes the image generating function 35 and the like. The processing circuitry 131 configured to realize the image generating function 35 corresponds to an image generating unit. Functions such as the image generating function 35 are stored in the memory 125 in the form of computer-executable programs. For example, the processing circuitry 131 is configured to realize the functions corresponding to the programs by reading and executing the programs from the memory 125. In other words, the processing circuitry 131 that has read the programs has the functions such as the image generating function 35. By employing the image generating function 35, the processing circuitry 131 is configured to reconstruct the MR image on the basis of the MR data transmitted from the sequence controlling circuitry 121. The processing circuitry 131 is configured to cause the reconstructed MR image to be stored into the memory 125 and/or to be displayed on the display 129.

In the description above, the example was explained in which the "processor" is configured to read and execute the programs corresponding to the functions from the memory 125. However, possible embodiments are not limited to this example. For instance, when the processor is a CPU, the processor is configured to realize the functions by reading and executing the programs saved in the memory 125. In contrast, when the processor is an ASIC, instead of having the programs saved in the memory 125, the functions are directly incorporated in the circuitry of the processor as logic circuitry. Further, the processors of the present embodiment do not each necessarily have to be structured as a single piece of circuitry. It is also acceptable to structure one processor by combining together a plurality of pieces of independent circuitry, so as to realize the functions thereof. Further, although the example was explained in which the single piece of storage circuitry is configured to store therein the programs corresponding to the processing functions, it is also acceptable to provide a plurality of pieces of storage circuitry in a distributed manner, so that the processing circuitry 131 reads a corresponding program from each of the individual pieces of storage circuitry.

An outline of the MRI apparatus 100 has thus been explained. Next, the bore tube 104 in the present embodiment will be explained. The bore tube 104 is a tube-shaped sound-proofing member (hereinafter, "sound-proofing tube") that is for the MRI apparatus 100 and is formed by using the composite material including the fiber material and the resin material. In the sound-proofing tube 104, the fiber material forms a woven structure by being woven along a plurality of directions. The woven structure is formed so as to continuously extend over at least one round of the lateral face of the sound-proofing tube 104. In this situation, each of the plurality of directions is a direction along which the fiber material angle (a cross angle) extends, with respect to the long-axis direction (i.e., a Z direction) of the bore tube 104.

Figure 2:
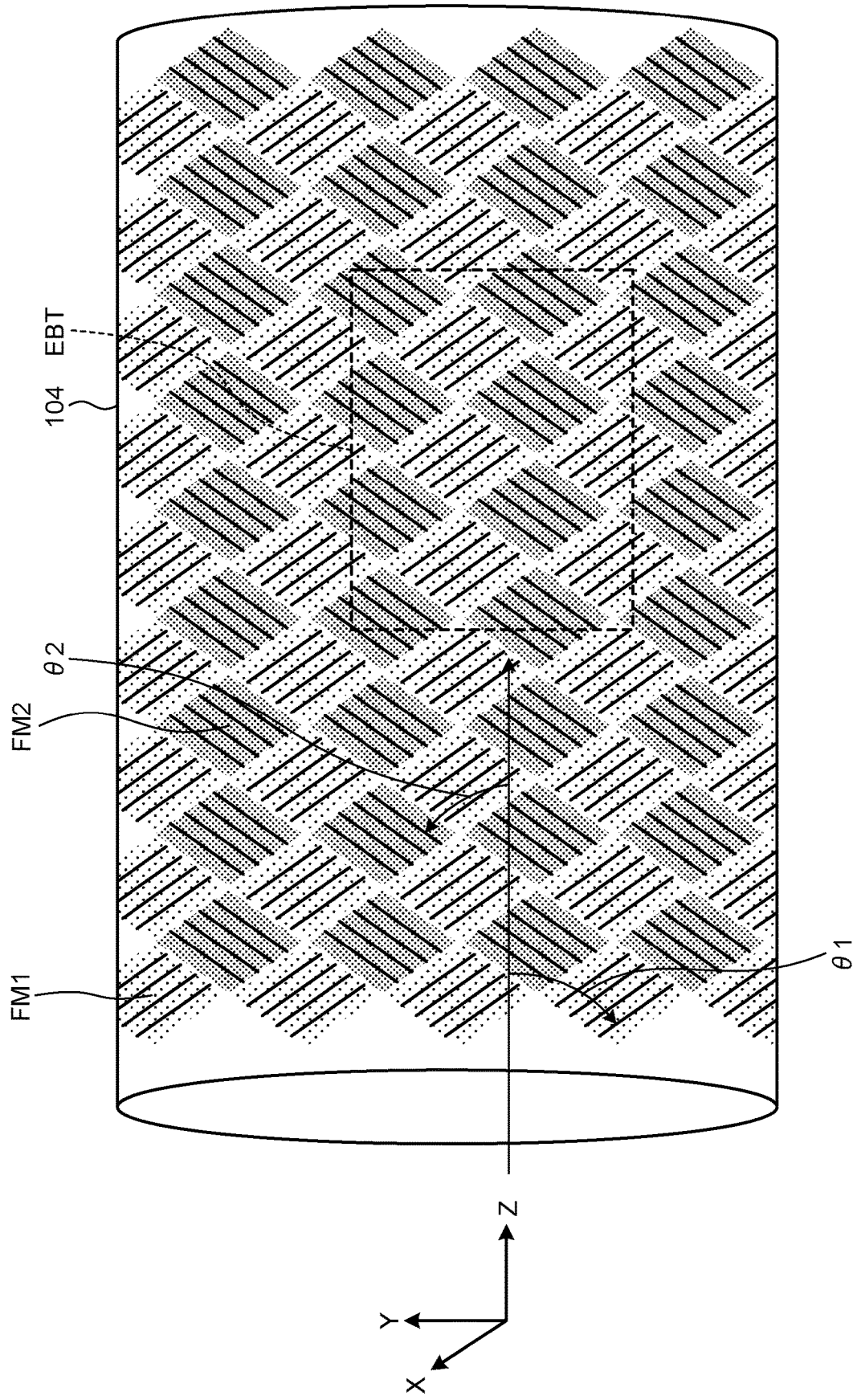
FIG. 2 is an external view according to the embodiment illustrating an exemplary external view of a woven structure in one layer in a bore tube.
Figure 3:
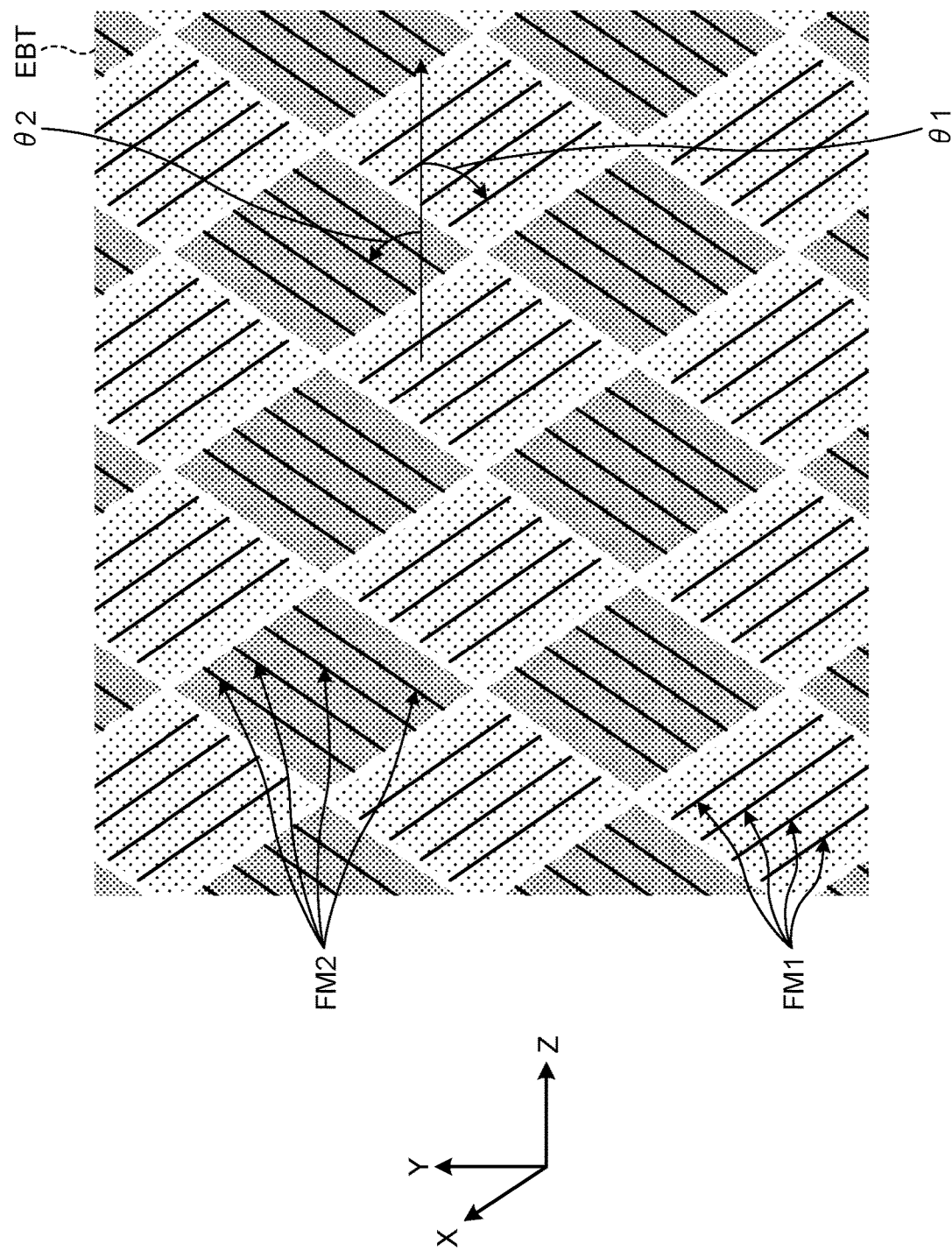
FIG. 3 is a drawing according to the embodiment illustrating an exemplary enlarged view magnifying a part of the bore tube in FIG. 2.

FIG. 2 is an external view illustrating an exemplary external view of the woven structure on a mandrel when the number of times of lamination is one, during a manufacturing process of the bore tube 104. FIG. 3 is a drawing illustrating an example of an enlarged view EBT magnifying a part of the bore tube 104 in FIG. 2. In FIGS. 2 and 3, a first fiber material FM1 extending from top left to bottom right has a first cross angle $\theta 1$. In contrast, in FIGS. 2 and 3, a second fiber material FM2 extending from bottom left to top right has a second cross angle $\theta 2$. The first fiber material FM1 and the second fiber material FM2 may be glass fiber materials having mutually-different specific gravity values or may be glass fiber materials having mutually the same specific gravity value. Further, the first fiber material FM1 and the second fiber material FM2 may be of mutually-different types of glass fiber or may be of mutually-different materials (e.g., glass fiber and one of various types of fiber such as carbon fiber or resin fiber).

In FIGS. 2 and 3, the space between the first fiber material FM1 and the second fiber material FM2 is filled with the resin material. For the resin material, it is possible to use any resin as long as the resin is able to impregnate the fiber, and the resin can be hardened. For example, it is possible to use thermosetting resin that can be hardened by applying heat thereto or thermoplastic resin that can be softened by applying heat thereto. A preferable example of the thermosetting resin is unsaturated polyester resin; however, epoxy resin or phenol resin may also be used. The composite material including the fiber materials (the first fiber material FM1 and the second fiber material FM2) and the resin material may be, for example, Fiber Reinforced Plastic (FRP). When the fiber materials are glass fiber, the composite material corresponds to Glass Fiber Reinforced Plastic (GFRP).

The cross angles of the fiber materials structuring the woven structure illustrated in FIGS. 2 and 3 may be prescribed angles that make it possible to inhibit vibration and noise caused by the gradient coil 103, for example. The inventor discovered that the effect of inhibiting the vibration and the noise is enhanced when the fiber direction in the fiber materials is closer to being parallel to the direction of vibration propagation. On the basis of this finding, a designer is able to arbitrarily set the first cross angle $\theta 1$ and the second cross angle $\theta 2$ illustrated in FIGS. 2 and 3 to be suitable for inhibiting the vibration and the noise caused by the gradient coil 103. It is possible to arbitrarily set the cross angles (e.g., the first cross angle $\theta 1$ and the second cross angle $\theta 2$) to be in the range from 20° to 70° inclusive, for example, during the manufacturing process of the bore tube 104. In other words, the cross angles of the fiber materials structuring the woven structure are in the range from 20° to 70° inclusive with respect to the long-axis direction of the sound-proofing tube 104.

Further, the density of the composite material has a prescribed density value that makes it possible to inhibit the vibration and the noise caused by the gradient coil 103. In other words, a designer is able to arbitrarily set the specific gravity of the composite material including the first fiber material FM1, the second fiber material FM2, and the resin material illustrated in FIGS. 2 and 3, in relation to an extent that the vibration and the noise caused by the gradient coil 103 are inhibited.

FIGS. 2 and 3 illustrate the woven structure on the mandrel when the number of times of lamination is one.

However, the bore tube 104 may have a structure in which a plurality of layers formed with the composite material are laminated. In other words, the sound-proofing tube corresponding to the bore tube 104 has a laminated structure in which the plurality of layers of the composite material are laminated. In that situation, the cross angles of the fiber materials structuring the woven structure and the density of the composite material may be set for each of the plurality of layers in the laminated structure. Because the content amount of the filling resin varies depending on the difference in the content amount between the fiber materials, the density of the composite material can, as a result, be adjusted. Further, the quantity of the plurality of layers in the laminated structure is the number of the laminated layers that make it possible to inhibit the vibration and the noise caused by the gradient coil 103 and may arbitrarily be set.

Further, to reduce the weight of the sound-proofing tube corresponding to the bore tube 104, the specific gravity values of the fiber materials need to be larger than the specific gravity value of the resin material. In other words, the specific gravity of the first fiber material FM1 and the specific gravity of the second fiber material FM2 are both larger than the specific gravity of the resin material.

To the shaping of the bore tube 104 (a manufacturing method), it is possible to apply one of known braiding methods, for example. In other words, as a means for making the fiber materials into the woven structure having a circular tube shape, a braiding method may be used, for example.

In the MRI apparatus 100 according to the embodiment described above, on the inner circumferential side of the gradient coil 103 which is provided on the inner circumferential side of the static magnetic field magnet 101 configured to generate the static magnetic field, in the sound-proofing tube 104 that is for the magnetic resonance imaging apparatus 100 and is formed by using the composite material including the fiber materials and the resin material, the woven structure is formed so as to continuously extend over at least one round of the lateral face of the sound-proofing tube 104. Further, in the sound-proofing tube (bore tube) 104 according to the present embodiment that is for the magnetic resonance imaging apparatus 100 and is formed by using the composite material including the fiber materials and the resin material, the woven structure is formed so as to continuously extend over at least one round of the lateral face of the sound-proofing tube 104, while the fiber materials are woven therein along the plurality of directions.

As a result, in the MRI apparatus 100 and the bore tube 104 according to the embodiment, because the plurality of fiber materials are formed as the continuous body and as the woven structure by being arranged at the arbitrary cross angles, it is possible to maintain/enhance the area density without increasing the thickness of the bore tube 104. In other words, in the MRI apparatus 100 and the bore tube 104 according to the embodiment, because the woven structure is formed in which the fiber materials are woven in each single layer, it is possible to increase the content amount of the fiber materials per layer.

Further, in the sound-proofing tube 104 for the MRI apparatus 100 according to the present embodiment, it is possible to arbitrarily adjust the cross angles of the fiber materials structuring the woven structure to be the prescribed angles that make it possible to inhibit the vibration and the noise caused by the gradient coil 103. As a result, by using the sound-proofing tube 104 for the MRI apparatus 100 according to the embodiment, it is possible to realize a required strength, the noise inhibiting function, the vibration inhibiting function, and the like, without increasing the thickness.

Furthermore, in the sound-proofing tube 104 for the MRI apparatus 100 according to the embodiment, the density of the composite material has the prescribed density value that makes it possible to inhibit the vibration and the noise. In addition, the sound-proofing tube 104 for the MRI apparatus 100 according to the embodiment has the laminated structure in which the plurality of layers of the composite material are laminated, while the cross angles and the density are set in advance for each of the plurality of layers, and the quantity of the plurality of layers is the number of the laminated layers that make it possible to inhibit the vibration and the noise. In addition, in the sound-proofing tube 104 for the MRI apparatus 100 according to the embodiment, the specific gravity values of the fiber materials are larger than the specific gravity value of the resin material.

Consequently, the sound-proofing tube 104 for the MRI apparatus 100 according to the embodiment makes it possible to change the content amounts and the woven angles (the cross angles) of the fiber materials for each of the laminated layers, for example. It is therefore possible to shape the novel bore tube 104 capable of realizing a required strength, the noise inhibiting function, and the vibration inhibiting function, in accordance with specifications of the MRI apparatus 100 and the sound-proofing tube 104 for the MRI apparatus 100.

As explained herein, because the bore tube 104 according to the embodiment has the woven structure, it is possible to increase the content amounts of the fiber materials without increasing the thickness. In addition, in the MRI apparatus 100 and the bore tube 104 according to the embodiment, because the fiber materials forming the continuous body are used in the woven structure, it is possible to make the structure (the bore tube 104) thinner, while maintaining the desired noise inhibiting function and vibration inhibiting function with a smaller number of laminated layers than in conventional examples. Consequently, the sound-proofing tube 104 for the MRI apparatus 100 according to the embodiment is able to realize a light weight and high rigidity, as well as the vibration inhibition, and the noise inhibition, at the same time. However, it is not necessarily mandatory to reduce the thickness compared to the bore tube 104 in conventional examples. Thus, the present embodiment is not meant to exclude realizing better vibration inhibition and noise inhibition with a thickness larger than the thicknesses in conventional examples.

Next, advantageous effects of the present embodiment will specifically be explained with reference to FIGS. 4 to 6. At first, a comparison example to be compared with the present embodiment will be explained. Then the advantageous effects of the present embodiment will be explained, in comparison to the comparison example.

Figure 4:
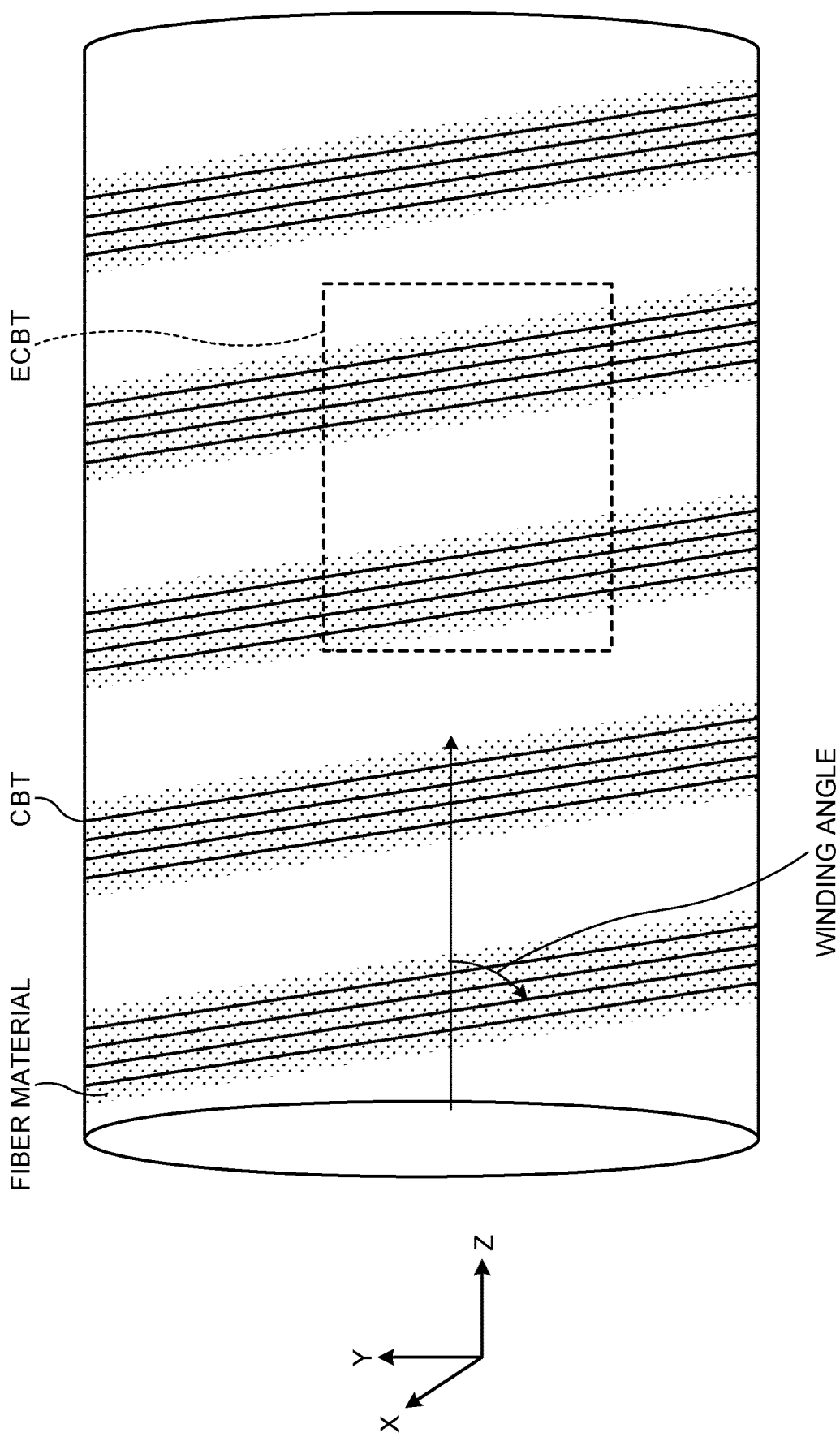
FIG. 4 is an external view illustrating an exemplary external view of one layer in a bore tube according to a comparison example.

FIG. 4 is an external view illustrating an exemplary external view of a bore tube CBT according to a comparison example on a mandrel, when the number of times of lamination is one. The bore tube in the comparison example has a structure in which a fiber material (reinforcing fiber) is wound around at an arbitrary angle (a winding angle). FIG. 5 is a drawing illustrating an example of an enlarged view ECBT magnifying a part of the bore tube CBT according to the comparison example in FIG. 4. As illustrated in FIGS. 4 and 5, in the bore tube CBT on the mandrel when the number of times of lamination is one, the fiber material having a constant width is arranged at regular intervals. In other words, when the number of times of lamination is one, the fiber material is wound around the mandrel in the same direction and at the regular intervals as illustrated in FIG. 4. That is to say, because there is a limit to the width of the fiber wound around the mandrel, it is difficult to wind the fiber material around the mandrel without gaps. For this reason, as illustrated in FIGS. 4 and 5, it is impossible to wind the fiber material around the entire mandrel when the number of times of lamination is one. Thus, there are some parts having the fiber material and the other parts having no fiber material. In contrast, according to the present embodiment, as illustrated in FIGS. 2 and 3, the fiber materials are wound around the mandrel to form the woven structure when the number of times of lamination is one. It is therefore possible to arrange the fiber materials around the entire mandrel, when the number of times of lamination is one.

Figures 5, 6:
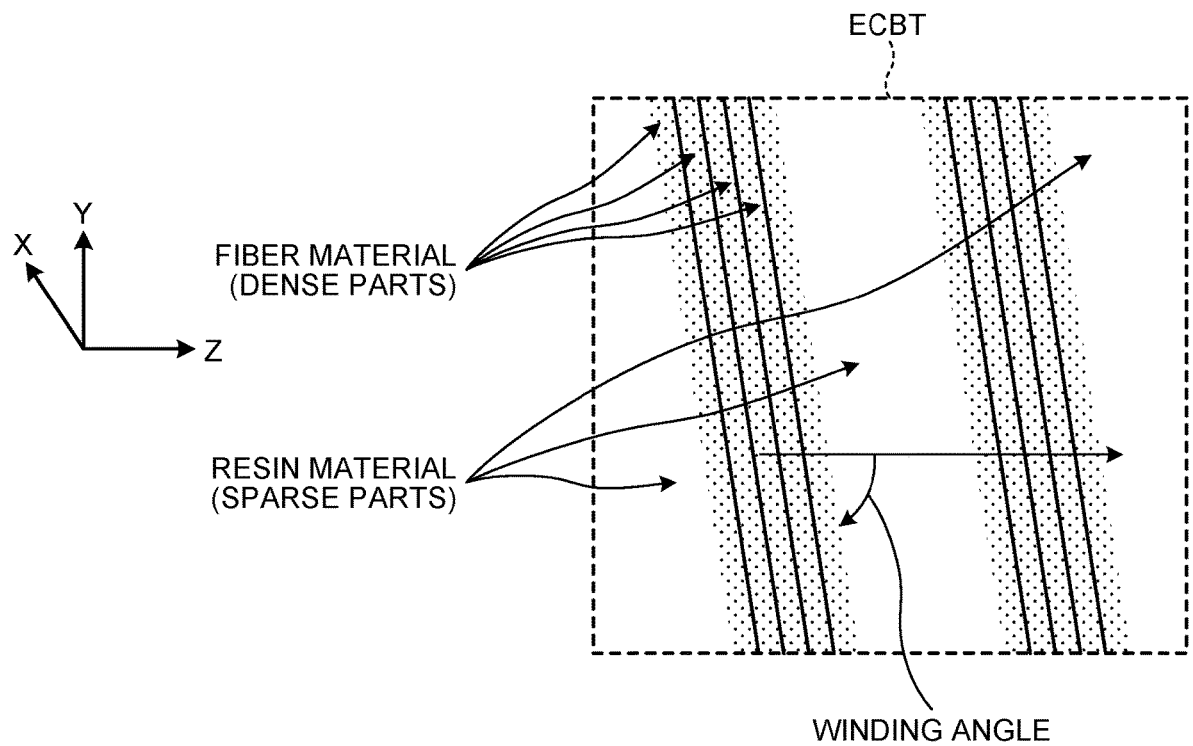
FIG. 5 is a drawing illustrating an exemplary enlarged view magnifying a part of the bore tube according to the comparison example in FIG. 4.
FIG. 6 presents tables indicating an exemplary composition of glass fiber and epoxy resin in a composite material according to the comparison example and an exemplary composition of glass fiber and epoxy resin in a composite material according to the embodiment.

As explained above, the bore tube CBT has the structure in which, as illustrated in FIGS. 4 and 5, the parts having the fiber material ("DENSE") and the parts having no fiber material ("SPARCE") are both present on the mandrel in a mixed manner when the number of times of lamination is one. For this reason, in the bore tube CBT according to the comparison example, the fiber material is laminated a prescribed number of times, to realize a strength, the vibration inhibiting function, and the noise inhibiting function, by eliminating the dense/sparce variation illustrated in FIGS. 4 and 5. In other words, in order to eliminate the dense/sparce variation illustrated in FIGS. 4 and 5, it is necessary to laminate (wind) the fiber material (around the mandrel) the prescribed number of times so that the fiber is arranged over the entire mandrel. Laminating the material the prescribed number of times contributes to making the bore tube CBT in the comparison example heavier.

FIG. 6 presents tables indicating an example of a composition CE of glass fiber and epoxy resin in a composite material according to the comparison example; and an example of a composition EM of glass fiber and epoxy resin in a composite material according to the embodiment. As illustrated in FIG. 6, it will be assumed that the composite materials are each glass fiber reinforced plastic (hereinafter, "GFRP").

As presented in FIG. 6, the density (g/cm$^3$) of the GFRP in the comparison example CE is calculated as 2.6×50/100+1.4×50/100=2.0 (g/cm$^3$). In contrast, when the woven structure of the present embodiment is adopted to make the composition ratio of the glass fiber 80% and the composition ratio of the epoxy resin 20%, the density (g/cm$^3$) of the GFRP according to the embodiment EM is calculated as 2.6×80/100+1.4×20/100=2.36 (g/cm$^3$). This indicates that the density of the GFRP is increased, as the composition ratio of the glass fiber is increased by using the woven structure.

Next, examples in which GFRP is laminated in the comparison example and the present embodiment will be explained. When the GFRP in the comparison example is laminated up to 5 cm, the area density is calculated as 10 (g/cm$^2$). In the comparison example after the lamination of 5 cm, the composition ratios of the glass fiber and the epoxy resin can be expressed as 250% for the glass fiber and 250% for the epoxy resin, because the thickness is five times larger. Accordingly, the density of the GFRP in the comparison example after the lamination of 5 cm is calculated as 10.0 (g/cm$^3$).

In contrast, to achieve the same area density as in the comparison example while using the GFRP composition of the present embodiment (i.e., to achieve a vibration inhibiting function and a noise inhibiting function similar to those of the comparison example), the thickness of the laminated structure is calculated as approximately 4.24 cm (10/2.36≈4.24). In the embodiment example after the lamination of 4.2 cm, the composition ratios of the glass fiber and the epoxy resin can approximately be expressed as 340% for the glass fiber and 85% for the epoxy resin, because the thickness is 4.24 times larger. Accordingly, the density of the GFRP in the present embodiment after the lamination of 4.24 cm is calculated as 7.2 (g/cm$^3$). Consequently, according to the present embodiment, it is possible to realize the sound-proofing tube 104 for the magnetic resonance imaging apparatus 100 that is able to achieve, at the same time, a lighter weight and enhanced rigidity as well as the vibration inhibition and the noise inhibition, in comparison to the conventional bore tube.

First Application Example

Figure 7:
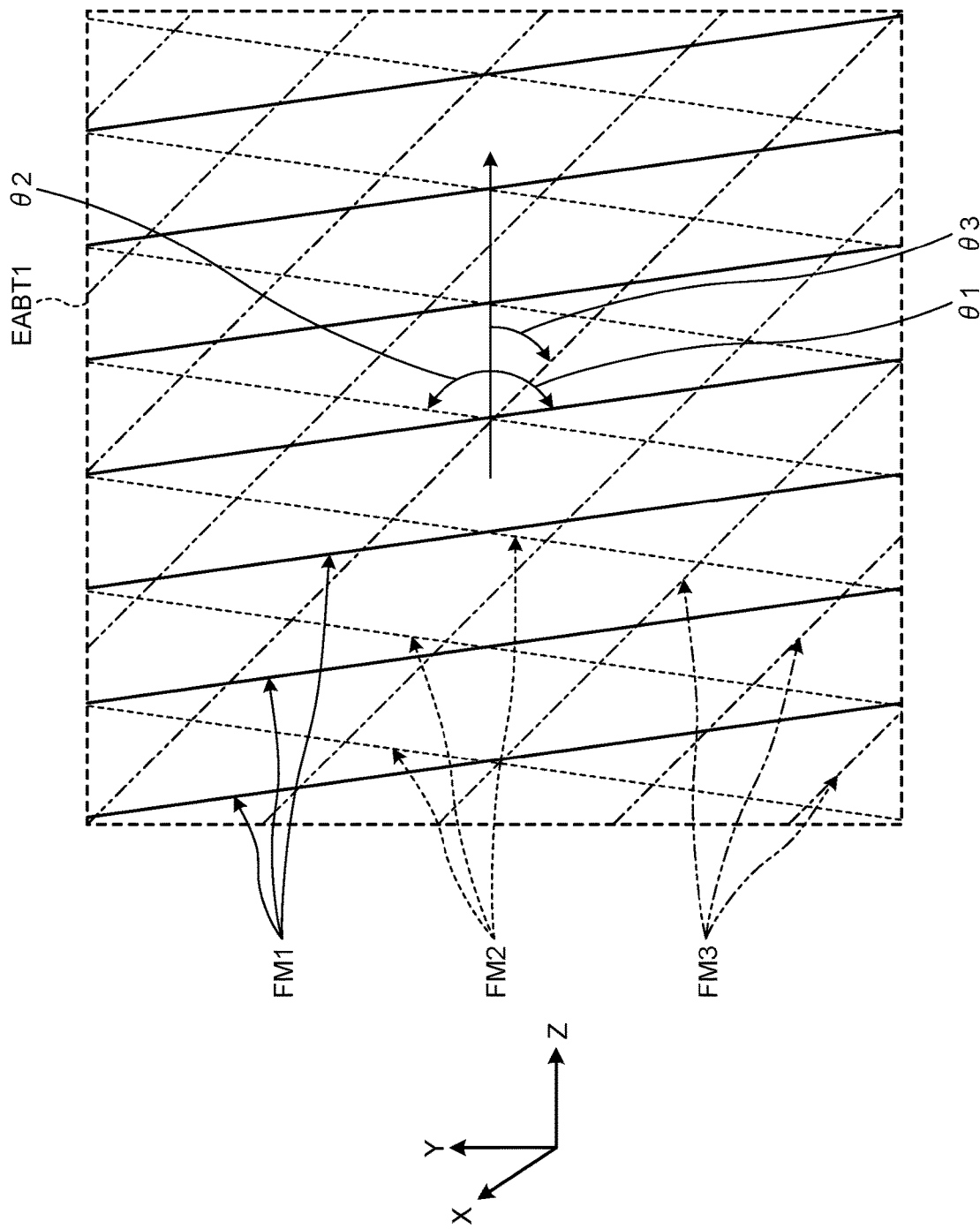
FIG. 7 is a drawing according to a first application example of the present embodiment illustrating an exemplary enlarged view magnifying a part of a bore tube in which, in addition to a first fiber material and a second fiber material, a third fiber material is woven.

FIG. 7 is a drawing according to a first application example of the present embodiment illustrating an example of an enlarged view EABT1 magnifying a part of the bore tube 104 in which, in addition to the first fiber material FM1 and the second fiber material FM2 illustrated in FIGS. 2 and 3, a third fiber material FM3 is woven. As illustrated in FIG. 7, a third cross angle θ3 of the third fiber material FM3 is different from the first cross angle θ1 and the second cross angle θ2.

As a result, in the first application example, it is possible to shape the bore tube 104 in which the third fiber material FM3 is further woven at the different angle in the radial direction. In other words, according to the first application example, it is possible to enhance the rigidity in comparison to the embodiment, while further inhibiting the vibration and the noise caused by the gradient coil 103. Because the advantageous effects of the present application example are the same as those of the embodiment, explanations thereof will be omitted.

Second Application Example

Figure 8:
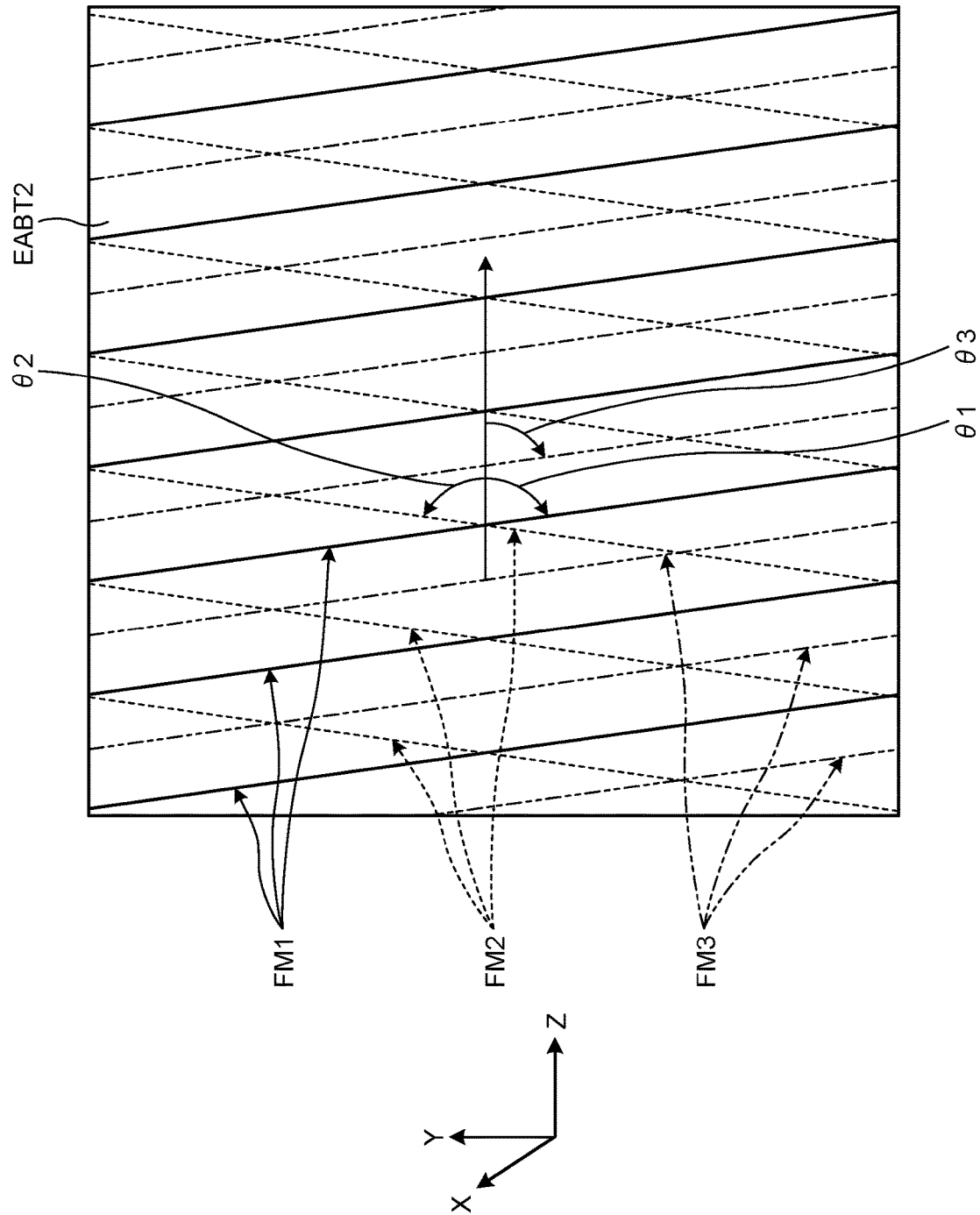
FIG. 8 is a drawing according to a second application example of the present embodiment illustrating an exemplary enlarged view magnifying a part of a bore tube in which, in addition to the first fiber material and the second fiber material, the third fiber material is woven.

FIG. 8 is a drawing according to a second application example of the present embodiment illustrating an example of an enlarged view EABT2 magnifying a part of the bore tube 104 in which, in addition to the first fiber material FM1 and the second fiber material FM2 illustrated in FIGS. 2 and 3, the third fiber material FM3 is woven. As illustrated in FIG. 8, although the third cross angle θ3 of the third fiber material FM3 is equal to the first cross angle θ1, the phase of the third fiber material FM3 is staggered from the phase of the first fiber material FM1 and the phase of the second fiber material FM2.

With this arrangement, according to the second application example, it is possible to shape the bore tube 104 in which the third fiber material FM3 having the different phase in the radial direction is further woven. In other words, according to the second application example, it is possible to enhance the rigidity in comparison to the embodiment and to further inhibit the vibration and the noise caused by the gradient coil 103. Because the advantageous effects of the present application example are the same as those of the embodiment, explanations thereof will be omitted. A method for manufacturing the sound-proofing tube 104 for the magnetic resonance imaging apparatus 100

Figure 9:
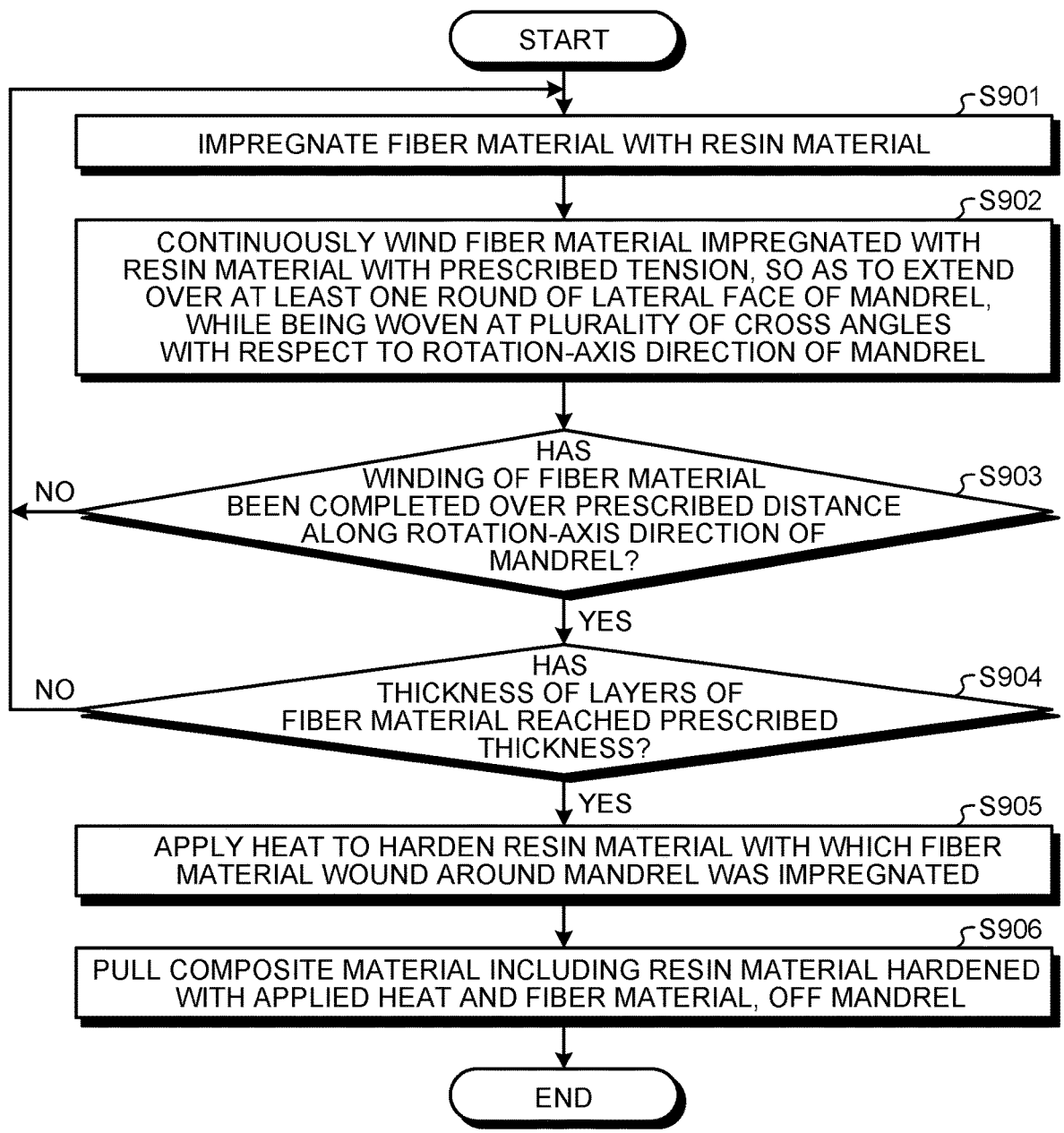
FIG. 9 is a chart illustrating an exemplary procedure of steps in a manufacturing method of a bore tube 104 according to the present embodiment.

Next, a manufacturing method of the bore tube 104 according to the present embodiment will be explained, with reference to FIG. 9. FIG. 9 is a chart illustrating an exemplary procedure of steps in the manufacturing method of the bore tube 104 according to the present embodiment. According to a manufacturing method of the woven structure used in the bore tube 104, the fiber material is formed (shaped (molded)) into a circular tube shape while weaving the fiber material therein by implementing a braiding method or the like. Because the braiding method is hitherto known, detailed explanations thereof will be omitted.

Further, the flowchart explained below illustrating the processes starting with impregnation with resin, followed by hardening with heat, and ending with demolding is merely an example. It is also possible to realize the shaping by using other shaping methods or means. In other words, it is possible to shape the bore tube 104 according to the present embodiment, regardless of the means used in the processing steps presented in the flowchart, as long as the procedure includes the three steps of (1) arranging a fiber material having a woven structure on a mandrel; (2) impregnating the fiber material with resin; and (3) shaping the form by hardening the resin and demolding the result.

Step S901:

The fiber material is impregnated with the resin material. The resin material corresponds to an adhesive agent and may be thermosetting resin, for example. The fiber material impregnated with the resin material is supplied to a carrier, which in turn supplies the fiber material to a core fixture called a mandrel.

Step S902:

The fiber material impregnated with the resin material is continuously wound around by the carrier with prescribed tension, so as to extend over at least one round of the lateral face of the mandrel while being woven at a plurality of cross angles with respect to the rotation-axis direction of the mandrel. For example, the fiber material is woven at the plurality of cross angles with respect to the rotation-axis direction of the mandrel, as a result of a circumferential-direction movement of the carrier around the mandrel being relative to the mandrel and another movement of the carrier relative to the mandrel toward the axial direction of the mandrel. In that situation, the cross angles are determined depending on a ratio between the speed of the circumferential-direction movement (the rotation of the mandrel or the carrier) and the moving speed toward the axial direction of the mandrel achieved by the mandrel or the carrier and the number of carriers and width of fiber material.

Step S903:

When the winding of the fiber material is completed over a prescribed distance along the rotation-axis direction of the mandrel (step S903: Yes), the process proceeds to step S904. On the contrary, when the winding of the fiber material has not been completed over the prescribed distance along the rotation-axis direction of the mandrel (step S903: No), the processes at step S901 and thereafter are repeatedly performed.

Step S904:

When the thickness of the layers of the fiber materials has reached a prescribed thickness (step S904: Yes), the process proceeds to step S905. On the contrary, when the thickness of the layers of the fiber materials has not reached the prescribed thickness (step S904: No), the processes at step S901 and thereafter are repeatedly performed.

Step S905:

The resin material with which the fiber material wound around the mandrel was impregnated is heated and hardened. The shaping of the bore tube 104 is thus completed. In this situation, the hardening of the resin material is not limited to applying heat thereto. It is possible to use other hardening methods as appropriate, such as hardening by time.

Step S906:

The composite material including the resin material hardened with the applied heat and the fiber material is pulled off the mandrel. The bore tube 104 has thus been manufactured through the steps described above.

As explained above, in the method for manufacturing the sound-proofing tube 104 for the magnetic resonance imaging apparatus 100 according to the embodiment, in an example, the sound-proofing tube for the magnetic resonance imaging apparatus 100 is manufactured by: impregnating the fiber material with the resin material; continuously winding the fiber material impregnated with the resin material with the prescribed tension, so as to extend over at least one round of the lateral face of the mandrel, while being woven at the plurality of cross angles with respect to the rotation-axis direction of the mandrel; and applying heat and hardening the resin material with which the fiber material wound around the mandrel was impregnated; and pulling the composite material including the resin material hardened with the applied heat and the fiber material, off the mandrel. In various methods for manufacturing the sound-proofing tube 104 for the magnetic resonance imaging apparatus 100, the sequential order and the method related to the impregnation with the resin and the hardening by applying heat may arbitrarily be selected for each manufacturing method.

According to the manufacturing method of the bore tube 104 of the present embodiment, because the bore tube 104 is manufactured while the fiber material is woven therein, it is possible to shorten the manufacturing time of the bore tube 104 by reducing the thickness. Because the advantageous effects of the manufactured bore tube 104 are the same as those of the embodiment, explanations thereof will be omitted.

EMBODIMENT EXAMPLES

In the present embodiment example, the materials used for a test piece related to a sound-proofing tube that is for an MRI apparatus and has the technical characteristics of the above embodiment, a manufacturing procedure of the test piece, details of tests performed on the test piece, and results of the tests performed on the test piece will be explained.

The materials used for the test piece are a fiber material and resin. The fiber material may be glass fiber (e.g., E-glass fiber), for example. Further, the resin may be epoxy resin, for example.

The manufacturing procedure of the test piece is as follows: The glass fiber is shaped into a woven structure. In other words, the woven structure in a plate-like form is shaped as a result of weaving the glass fiber into the plate-like form. Subsequently, for example, the epoxy resin is poured into the woven structure by implementing a Vacuum-assisted Resin Transfer Molding (VaRTM) method. More specifically, the plate-like woven structure is impregnated with the epoxy resin, by making a vacuum of approximately 85 kPa and implementing a Resin Transfer Molding (RTM) method which is a type of shaping method. Subsequently, the woven structure impregnated with the epoxy resin is shaped by being hardened with applied heat.

The impregnation temperature (the heating temperature) may be 130° C., for example. Further, the heating period (hardening period) may be two hours, for example. The atmospheric pressure (85 kPa) related to the vacuum impregnation with the epoxy resin, the impregnation temperature (130° C.), and the heating period (2 hours) are merely examples. Possible embodiments are not limited to these examples. It is possible to make changes as appropriate, in accordance with the materials used in the test piece. The test piece is manufactured by cutting out a segment having a length of 80 mm, for example, from the shaped product that was shaped as described above.

Figure 10:
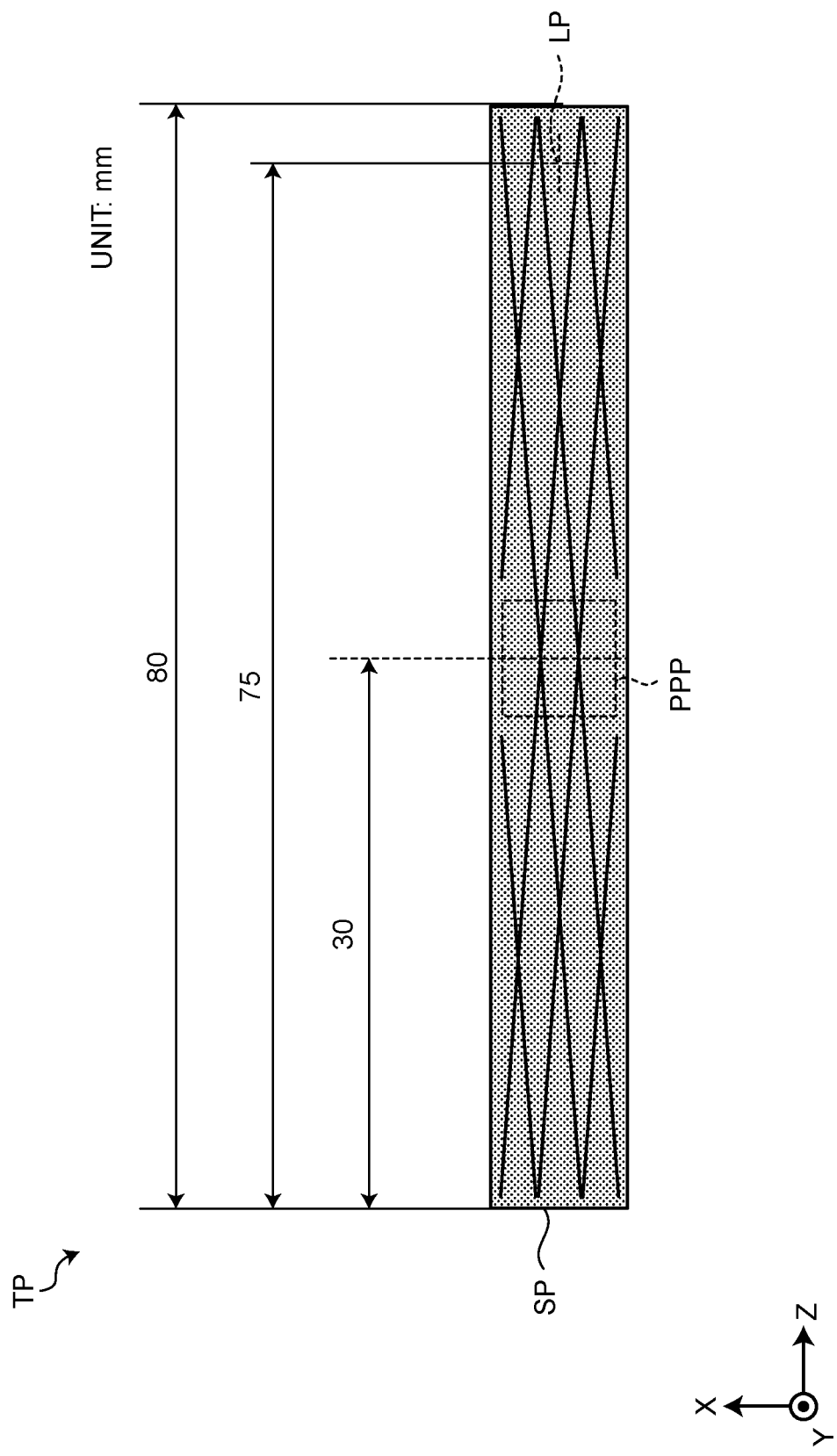
FIG. 10 is a drawing according to an embodiment example of the embodiment illustrating an example of a top face (the face facing upwards in the vertical direction) of a test piece.

Next, details of the tests performed on the test piece will be explained. FIG. 10 is a drawing illustrating an example of the top face (the face facing upwards in the vertical direction) of a test piece TP. As illustrated in FIG. 10, the length of the test piece TP in the long-axis direction was 80 mm. As illustrated in FIG. 10, a first end of the test piece TP in terms of the long-axis direction served as a fixed end and was supported by a supporting mechanism so as to be off a floor surface. The position in which the test piece TP was supported by the supporting mechanism corresponds to a support point SP in FIG. 10. A second end of the test piece TP in terms of the long-axis direction was a free end. To the test piece TP, a load was applied by a force gauge, for example, at the position 5 mm away from the second end (the free end) (i.e., at the position 75 mm away from the fixed end). The position at which the load was applied to the test piece TP corresponds to an excitation point (a load point) LP. On the test piece TP, at the position 30 mm away from the fixed end, a pick PPP used for measuring acceleration of the test piece TP was pasted. The position of the PPP on the test piece TP corresponds to an acceleration pickup. However, the dimensions illustrated in FIG. 10 are merely examples, and possible dimensions are not limited to these examples.

Figure 11:
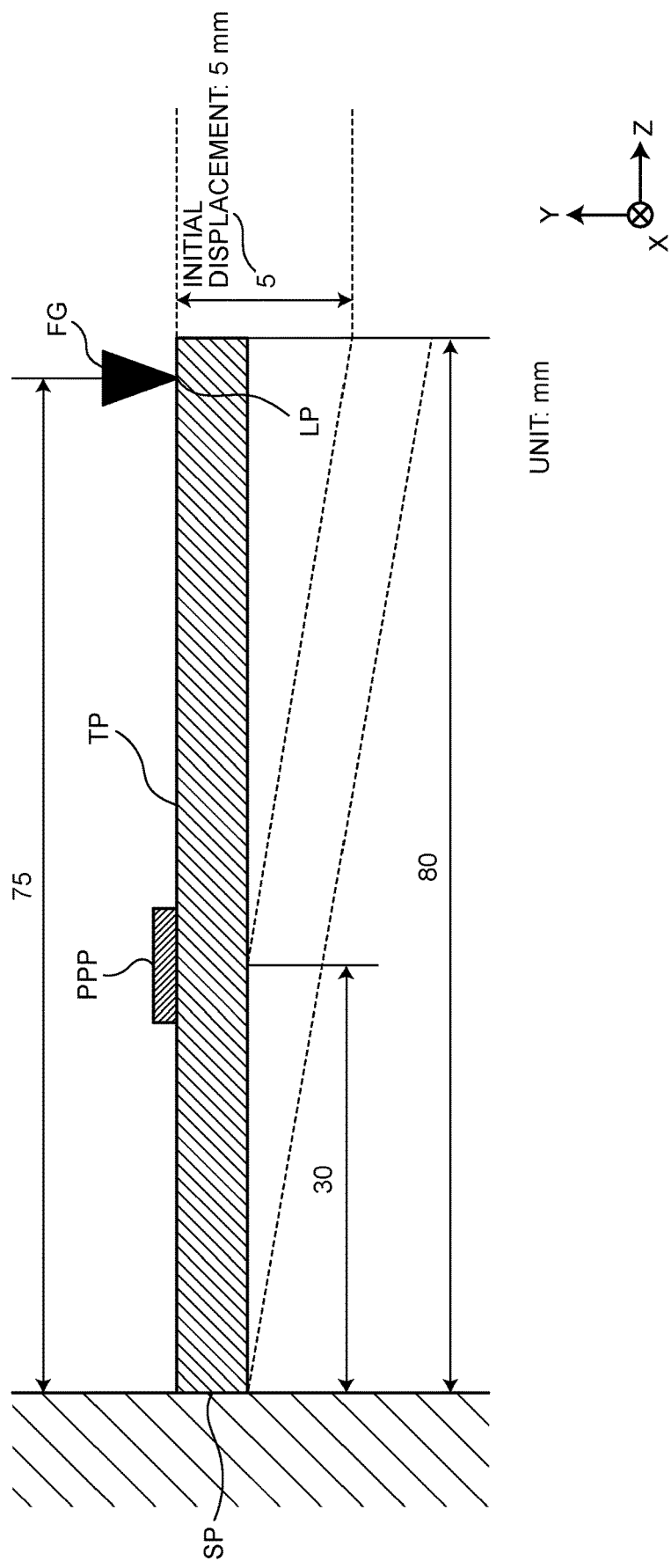
FIG. 11 is a drawing according to the embodiment example of the embodiment illustrating an exemplary outline of a test system for the test piece.

FIG. 11 is a drawing illustrating an exemplary outline of a test system for the test piece TP. As illustrated in FIG. 11, the test piece TP was pressed down by 5 mm by a force gauge FG vertically downward at the load point LP. The vertically downward pressing of the force gauge FG by 5 mm corresponds to an initial displacement of the test piece TP. As a result, as illustrated in FIG. 11, the test piece TP was warped downward in the vertical direction, from the position in the horizontal direction.

After the test piece TP was warped due to the initial displacement of 5 mm at the excitation point LP, when the warp was released, acceleration of the test piece TP was measured via the acceleration pickup PPP. On the basis of the measured acceleration and the measured load of pressdown, a Young's modulus (GPa), an attenuation ratio $\zeta$, and the like of the test piece TP were calculated through known analysis processes. The Young's modulus is an index indicating the magnitude of rigidity of the test piece TP. The larger the Young's modulus is, the higher is the rigidity. Further, the attenuation ratio is an index indicating difficulty to be vibrated by vibration. The larger the attenuation ratio is, the more difficult it is to be vibrated. In other words, the larger the attenuation ratio is, the better a sound caused by propagated vibration can be cancelled. That is to say, the larger the attenuation ratio is, the higher sound dampening capability the material has.

FIG. 12 is a table indicating examples of analysis results of the tests performed on a test piece having a 20° cross angle, another test piece having a 45° cross angle, and yet another test piece having a 70° cross angle. As presented in FIG. 12, the larger the cross angle is, the larger is the Young's modulus. Accordingly, as presented in FIG. 12, the larger the cross angle is, the higher is the rigidity of the sound-proofing tube. Also, as presented in FIG. 12, the larger the cross angle is, the larger the attenuation ratio. Consequently, as presented in FIG. 12, the larger the cross angle is, the higher sound dampening capability the sound-proofing tube has.

FIG. 13 is a table indicating examples of results of analyzing Young's modulus (GPa) values from tests performed on the test piece having the 45° cross angle and another test piece woven with cross angles of 20° and 70°. An average of the cross angles of the test piece woven with the cross angles of 20° and 70° is 45°. As presented in FIG. 13, the Young's modulus of the test piece having the single cross angle of 45° was 10.2 GPa, whereas the Young's modulus of the test piece woven with the cross angles of 20° and 70° was 18.4 GPa. Accordingly, as presented in FIG. 13, the test piece woven with the cross angles of 20° and 70° has higher rigidity than the test piece having the single cross angle of 45°.

According to at least one aspect of the embodiments and the like described above, it is possible to realize the sound-proofing tube 104 that is for the magnetic resonance imaging apparatus 100 and is capable of enhancing the vibration inhibition and the noise inhibition while having high rigidity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sound-proofing tube that is for a magnetic resonance imaging apparatus and is formed by using a composite material including a fiber material and a resin material, wherein
   the fiber material forms a woven structure by being woven therein, and
   the woven structure is formed so as to continuously extend over at least one round of a lateral face of the sound-proofing tube.

2. A magnetic resonance imaging apparatus comprising:
   a gradient coil provided on an inner circumferential side of a static magnetic field magnet configured to generate a static magnetic field; and
   a sound-proofing tube that is for the magnetic resonance imaging apparatus and is formed on an inner circumferential side of the gradient coil by using a composite material including a fiber material and a resin material, wherein
   the fiber material forms a woven structure by being woven therein, and
   the woven structure is formed so as to continuously extend over at least one round of a lateral face of the sound-proofing tube.

3. A manufacturing method for manufacturing a sound-proofing tube for a magnetic resonance imaging apparatus, the manufacturing method comprising:
   impregnating a fiber material with a resin material;
   continuously winding the fiber material impregnated with the resin material around a lateral face of a mandrel, while weaving the fiber material therein at a plurality of cross angles with respect to a rotation-axis direction of the mandrel;
   hardening the resin material with which the fiber material wound around the mandrel was impregnated; and pulling a composite material including the hardened resin material and the fiber material off the mandrel.

4. The sound-proofing tube for a magnetic resonance imaging apparatus according to claim 1, wherein the fiber material forms the woven structure while being woven at a plurality of cross angles.

5. The sound-proofing tube for a magnetic resonance imaging apparatus according to claim 1, wherein
   the sound-proofing tube has a laminated structure in which a plurality of layers of the composite material are laminated, and
   a quantity of the plurality of layers is a number of the laminated layers that make it possible to inhibit vibration and noise caused by a gradient coil.

6. The sound-proofing tube for a magnetic resonance imaging apparatus according to claim 1, wherein a specific gravity of the fiber material is larger than a specific gravity of the resin material.

7. The sound-proofing tube for a magnetic resonance imaging apparatus according to claim 4, wherein the plurality of cross angles of the fiber material forming the woven structure are in a range from 20° to 70° inclusive with respect to a long-axis direction of the sound-proofing tube.

8. The sound-proofing tube for a magnetic resonance imaging apparatus according to claim 7, wherein
   the sound-proofing tube has a laminated structure in which a plurality of layers of the composite material are laminated, and
   a corresponding cross angle and a density of the composite material is set for each of the plurality of layers.

* * * * *